US012689690B2

(12) United States Patent
Pope et al.

(10) Patent No.: US 12,689,690 B2
(45) Date of Patent: Jul. 21, 2026

(54) METHOD TO IDENTIFY TEXT SUPPORT AVAILABILITY AND LANGUAGE FOR EMERGENCY RESPONSE CENTERS AND TO ENABLE TEXT-TO-VOICE CONVERSATION STREAMING

(71) Applicant: Intrado Life & Safety, Inc., Longmont, CO (US)

(72) Inventors: Adan K. Pope, Riverside, IL (US); Michel Brkovic, St-Eustache (CA)

(73) Assignee: INTRADO LIFE & SAFETY, INC., Longmont, CO (US)

( * ) Notice: Subject to any disclaimer, the term of this patent is extended or adjusted under 35 U.S.C. 154(b) by 298 days.

(21) Appl. No.: 18/238,911

(22) Filed: Aug. 28, 2023

(65) Prior Publication Data

US 2025/0080649 A1    Mar. 6, 2025

(51) Int. Cl.
*H04M 3/51* (2006.01)
*G06F 40/58* (2020.01)
*H04W 4/90* (2018.01)

(52) U.S. Cl.
CPC .......... *H04M 3/5116* (2013.01); *G06F 40/58* (2020.01); *H04W 4/90* (2018.02)

(58) Field of Classification Search
CPC ........ H04M 3/5116; H04W 4/90; G06F 40/58

USPC ...................................................... 455/404.1
See application file for complete search history.

(56) References Cited

U.S. PATENT DOCUMENTS

| | | | | |
|---|---|---|---|---|
| 12,001,749 | B1* | 6/2024 | Doyle, III ............. | G06F 3/1454 |
| 2004/0176123 | A1* | 9/2004 | Chin ................... | H04L 12/2854 |
| | | | | 455/404.1 |
| 2010/0003953 | A1* | 1/2010 | Ray ......................... | H04W 4/90 |
| | | | | 455/404.1 |
| 2013/0252649 | A1* | 9/2013 | Siomina ................ | H04W 4/029 |
| | | | | 455/466 |
| 2015/0289121 | A1* | 10/2015 | Lesage ................. | G08B 25/006 |
| | | | | 455/404.1 |
| 2017/0188218 | A1* | 6/2017 | Corley ................... | G10L 15/26 |
| 2017/0289350 | A1* | 10/2017 | Philbin ................ | G08B 25/016 |
| 2021/0150289 | A1* | 5/2021 | Wei ........................ | G06V 30/268 |
| 2023/0303121 | A1* | 9/2023 | Kaur ....................... | H04W 4/90 |

* cited by examiner

*Primary Examiner* — Maria El-Zoobi
(74) *Attorney, Agent, or Firm* — PATENT CAPITAL GROUP

(57) ABSTRACT

A method includes receiving an emergency contact; determining an emergency deployment, at least in part based on the emergency contact; determining a public safety access point (PSAP), at least in part based on the emergency deployment; and transmitting a PSAP request to the PSAP, at least in part based on the emergency contact.

17 Claims, 5 Drawing Sheets

100

120

140

160

180

100

120

140

160

180

300

METHOD TO IDENTIFY TEXT SUPPORT AVAILABILITY AND LANGUAGE FOR EMERGENCY RESPONSE CENTERS AND TO ENABLE TEXT-TO-VOICE CONVERSATION STREAMING

BACKGROUND

Technical Field

This disclosure relates to identifying capabilities of emergency response centers and, in particular, to enhancing an emergency contact in view of those capabilities.

Related Art

Currently, when a user encounters an emergency situation, the user can use a user device (e.g., a smartphone) to contact a public safety access point (PSAP) that dispatches emergency services. Sophisticated call handling underlies this emergency contact within the United States. However, inefficiencies still arise.

In addition, such inefficiencies arise even among the most sophisticated emergency response centers. Needless to say, not all emergency response centers are equally sophisticated. Further, there is no standard PSAP model outside of the US.

BRIEF SUMMARY

In a first implementation of the present disclosure, a method includes receiving an emergency contact; determining an emergency deployment, at least in part based on the emergency contact; determining a public safety access point (PSAP), at least in part based on the emergency deployment; and transmitting a PSAP request to the PSAP, at least in part based on the emergency contact.

A second implementation is the first implementation, further comprising: determining a first language of the emergency contact.

A third implementation is the second implementation, further comprising: receiving a registration request identifying a second language; and translating the emergency contact into the second language to produce the PSAP request.

A fourth implementation is any of the first through third implementations, further comprising: receiving a registration request, the registration request including a capability of the PSAP, wherein the PSAP is determined at least in part based on the capability.

A fifth implementation is the fourth implementation, wherein the registration request includes a jurisdiction of the PSAP, the emergency contact includes a location, and the PSAP is determined at least in part based on the jurisdiction and the location.

A sixth implementation is any the first through fifth implementations, further comprising: receiving a PSAP reply; and transmitting an emergency reply, at least in part based on the PSAP reply.

A seventh implementation is the sixth implementation, further comprising: translating the PSAP reply to the first language to produce the emergency reply.

In an eighth implementation, an apparatus includes a network interface that receives an emergency contact; and a processor configured to determine an emergency deployment, at least in part based on the emergency contact, and to determine a public safety access point (PSAP), at least in part based on the emergency deployment, wherein the network interface transmits a PSAP request to the PSAP, at least in part based on the emergency contact.

A ninth implementation is the eighth implementation, wherein the processor further is configured to determine a first language of the emergency contact.

A tenth implementation is the ninth implementation, wherein the network interface receives a registration request identifying a second language, and the processor further is configured to translate the emergency contact into the second language to produce the PSAP request.

An eleventh implementation is any of the eighth through tenth implementations, wherein the network interface receives a registration request, the registration request including a capability of the PSAP, and the processor further is configured to determine the PSAP at least in part based on the capability.

A twelfth implementation is the eleventh implementation, wherein the registration request includes a jurisdiction of the PSAP, the emergency contact includes a location, and the processor further is configured to determine the PSAP at least in part based on the jurisdiction and the location.

A thirteenth implementation is any of the eighth through twelfth implementations, wherein the network interface receives a PSAP reply and transmits an emergency reply, at least in part based on the PSAP reply.

A fourteenth implementation is the thirteenth implementation, wherein the processor further is configured to translate the PSAP reply to the first language to produce the emergency reply.

In a fifteenth implementation, a computer-readable medium includes instructions that, when executed by a processor, perform operations comprising: determining an emergency deployment, at least in part based on an emergency contact; and determining a public safety access point (PSAP), at least in part based on the emergency deployment, wherein a PSAP request is transmitted to the PSAP, at least in part based on the emergency contact.

A sixteenth implementation is the fifteenth implementation, the operations further comprising: determining a first language of the emergency contact.

A seventeenth implementation is the sixteenth implementation, the operations further comprising: translating the emergency contact into a second language to produce the PSAP request, at least in part based on a received registration request identifying the second language.

An eighteenth implementation is any of the fifteenth through seventeenth implementations, the operations further comprising: receiving a registration request, the registration request including a capability of the PSAP, wherein the PSAP is determined at least in part based on the capability.

A nineteenth implementation is the eighteenth implementation, wherein the registration request includes a jurisdiction of the PSAP, the emergency contact includes a location, and the PSAP is determined at least in part based on the jurisdiction and the location.

A twentieth implementation is any of the fifteenth through nineteenth implementations, the operations further comprising: transmitting an emergency reply, at least in part based on a received PSAP reply.

A twenty-first implementation is the twentieth implementation, the operations further comprising: translating the PSAP reply to the first language to produce the emergency reply.

In a twenty-second implementation, an apparatus includes communication means for receiving an emergency contact; and processing means for determining an emergency deployment, at least in part based on the emergency contact and for determining a public safety access point (PSAP), at least in part based on the emergency deployment, wherein the communication means transmit a PSAP request to the PSAP, at least in part based on the emergency contact.

A twenty-third implementation is the twenty-second implementation, wherein the processing means determines a first language of the emergency contact.

A twenty-fourth implementation is the twenty-third implementation, wherein the communication means receives a registration request identifying a second language, and the processing means translates the emergency contact into the second language to produce the PSAP request.

A twenty-fifth implementation is any of the twenty-second through twenty-fourth implementations, wherein the communication means receives a registration request, the registration request including a capability of the PSAP, and the processing means determines the PSAP at least in part based on the capability.

A twenty-sixth implementation is the twenty-fifth implementation, wherein the registration request includes a jurisdiction of the PSAP, the emergency contact includes a location, and the processing means determines the PSAP at least in part based on the jurisdiction and the location.

A twenty-seventh implementation is any of the twenty-second through twenty-sixth implementations, wherein the communication means receives a PSAP reply and transmits an emergency reply, at least in part based on the PSAP reply.

A twenty-eighth implementation is the twenty-seventh implementation, wherein the processing means translates the PSAP reply to the first language to produce the emergency reply.

DETAILED DESCRIPTION

Implementations of the present disclosure can identify the capabilities of a PSAP. This identification is a step toward interfacing between a user device reporting an emergency and the arrival of a dispatched emergency service.

For example, a call for an ambulance today might be routed to a public safety access point (PSAP) without ambulance dispatch capabilities. Implementations of the present disclosure can avoid such an inefficiency.

Figure 1:
FIG. 1 illustrates an implementation of a system, according to an implementation of the present disclosure.

FIG. 1 illustrates an implementation of a system 100, according to an implementation of the present disclosure. FIG. 1 shows a user device (e.g., a smartphone) 140 at a location 120, a server 160, and a call center 180.

In the example of FIG. 1, a user has visited the location 120 with their user device 140. Like many Americans, the user's preferred language might be a language other than English, such as French or Spanish.

The system 100 can be initialized by the call center 180 registering its PSAP ID and capabilities with the server 160. These capabilities can include, for example, whether the call center 180 can receive text messages, what languages are understood at the call center 180, and the emergency service dispatch capabilities and jurisdictional boundaries thereof of the call center 180.

The location 120 can be in, for example, Yellowstone National Park, which spans Wyoming, Montana, and Idaho. In the case of an emergency, the user might not know which emergency authority (e.g., whether park rangers or emergency services of a specific state) is appropriate to contact.

Even if the user is aware of the appropriate emergency authority, the user likely does not know by which methods that authority is capable of communicating (e.g., via text message). Further, the user might be unaware of what are the emergency dispatch capabilities of the emergency authority. In addition, the user's preferred language might or might not be accommodated by the emergency authority.

To potentially address the above-noted issues, when the emergency occurs, the user sends an emergency contact via the user device 140. The emergency contact can be a voice message (e.g., a phone call, a voice mail, a video, or other format including a voice) or a non-voice message (e.g., a text message, an image). In the illustrated example, the emergency contact is written in Spanish. Further, the emergency contact can include an ID of the user device 140.

In many implementations, a relay device receives the emergency contact from the user device and relays the emergency contact to the server 160.

The server 160 receives the emergency contact.

The server 160 can determine the location 120 of the user device 140. In various implementations, the user device 140 can include an identifier of the location 120 in the emergency contact. For example, if the emergency contact is a voice message, then the user can speak the location 120. If the emergency contact is a non-voice message, then the user can otherwise include the location 120 (e.g., by typing). In an implementations in which the user device 140 transmits the emergency contact via an app, the app can include an identifier of the location 120 in the emergency contact.

In another implementation, upon receipt of the emergency contact, the relay device can add an identifier of the location 120 to the emergency contact. In still another implementation, the server 160 can geolocate the user device 140, upon receipt of the emergency contact. For example, the server 160 can be connected to an antenna array that can perform a triangulation of the user device 140, based on the identifier of the user device 140.

The server 160 can determine an ID of a PSAP that serves the location 120, based on searching a database for the location 120. Such a database can be provided by Intrado Corporation, for example.

Routing the emergency contact to a PSAP based merely on location might result in inefficient handling of the situation. For example, not all PSAPs can receive the emergency contact, if the emergency contact is a text message. If the server forwards such an emergency contact to such a PSAP, then the emergency contact might go unaddressed.

Further, PSAP service area boundaries are not necessarily co-extensive with emergency service area boundaries, nor are emergency service area boundaries necessarily co-extensive with each other. Thus, even if the inability to receive text messages is overcome, the PSAP still might handle the emergency contact inefficiently. For example, not all PSAPs have the capability to deploy each type of emergency service. And, even if a PSAP has the capability to deploy each type of emergency service, that capability does not mean the PSAP has that capability for the location 120.

Additionally, even if the PSAP can deploy a relevant emergency service to the location 120, the PSAP might not understand the language used in the emergency contact. Therefore, precious time can be lost, while the PSAP attempts to understand the emergency contact.

To overcome these difficulties, in the advantageous implementation of FIG. 1, the server 160 can determine the communication, deployment, and language capabilities of the PSAP. Thus, the server 160 can forward the emergency contact to a PSAP that can receive the emergency contact, understand the emergency contact, and dispatch an appropriate deployment to the location 120.

Thus, in the example of FIG. 1, the server 160 determines a PSAP, based on the location 120, the deployment identified by the emergency contact, and the language in which the emergency contact was sent.

In this example, the call center 180 lacks text capabilities. Therefore, the server 160 can determine the call center 180 lacks text capabilities, based on the registration.

In some implementations, the server 160 can determine another call center to which the emergency contact can be forwarded. In this example, the server 160 determines to proceed with the call center 180.

In some implementations, the server 160 can translate the emergency contact into a language understood at the call center 180. For example, if only one PSAP can dispatch the identified deployment, then the server 160 can translate the emergency contact from the language in which the emergency contact was sent to a language understood at the call center 180.

Further, the server can determine the emergency contact is in Spanish, which is not supported by the call center 180. Accordingly, the server 160 can translate the emergency contact into English. The server 160 can convert the format of the emergency contact from a non-voice message to a voice message, based on a determination that the call center 180 cannot receive text messages.

If the emergency contact is a voice message, then the server 160 can add a transcription of the emergency call for evidentiary purposes.

The server 160 then transmits a PSAP request to the determined PSAP, which is the call center 180. The PSAP request can include an English-language voice message and can include or identify the location 120.

The call center 180 then reproduces the PSAP request. For example, the call center 180 can play the voice message on headphones of a call taker in the call center 180. The call taker can dispatch the emergency service deployment to the location 140.

In some implementations, the call center 180 can then return a PSAP reply to the user device 140. For example, the call taker can speak a voice message recorded by a microphone at the call center 180 as the PSAP reply. The call center 180 then transmits the PSAP reply.

The server 160 can receive the PSAP reply. The server 160 can determine a format for an emergency reply, based on a format (e.g., voice or non-voice) of the emergency contact. In the illustrated example, the server 160 determines the PSAP reply is a voice message and the emergency contact is a non-voice message.

Then, the server 160 can determine a language of the PSAP reply.

Further, because the call center 180 does not necessarily share a language with the emergency contact, the server 160 can translate the PSAP reply to Spanish.

The server 160 then can transmit an emergency reply, based on an ID of the user device 140. In several implementations, the emergency reply is a text message in Spanish. The content of the emergency reply can be or include the text or speech in the PSAP reply (although possibly translated).

The user device 140 can receive the emergency reply and reproduce the emergency reply by, for example, playing a voice message or displaying a non-voice message.

In the example of FIG. 1, the location 120 was described as being in a remote, rural area. However, neither the system 100 generally nor the location 120 specifically are limited to such an area. In many implementations, the location 120 is a well-documented, urban location.

In various implementations, phrases like "ambulance dispatch" advantageously can be generalized to various languages or communication media.

Figure 2:
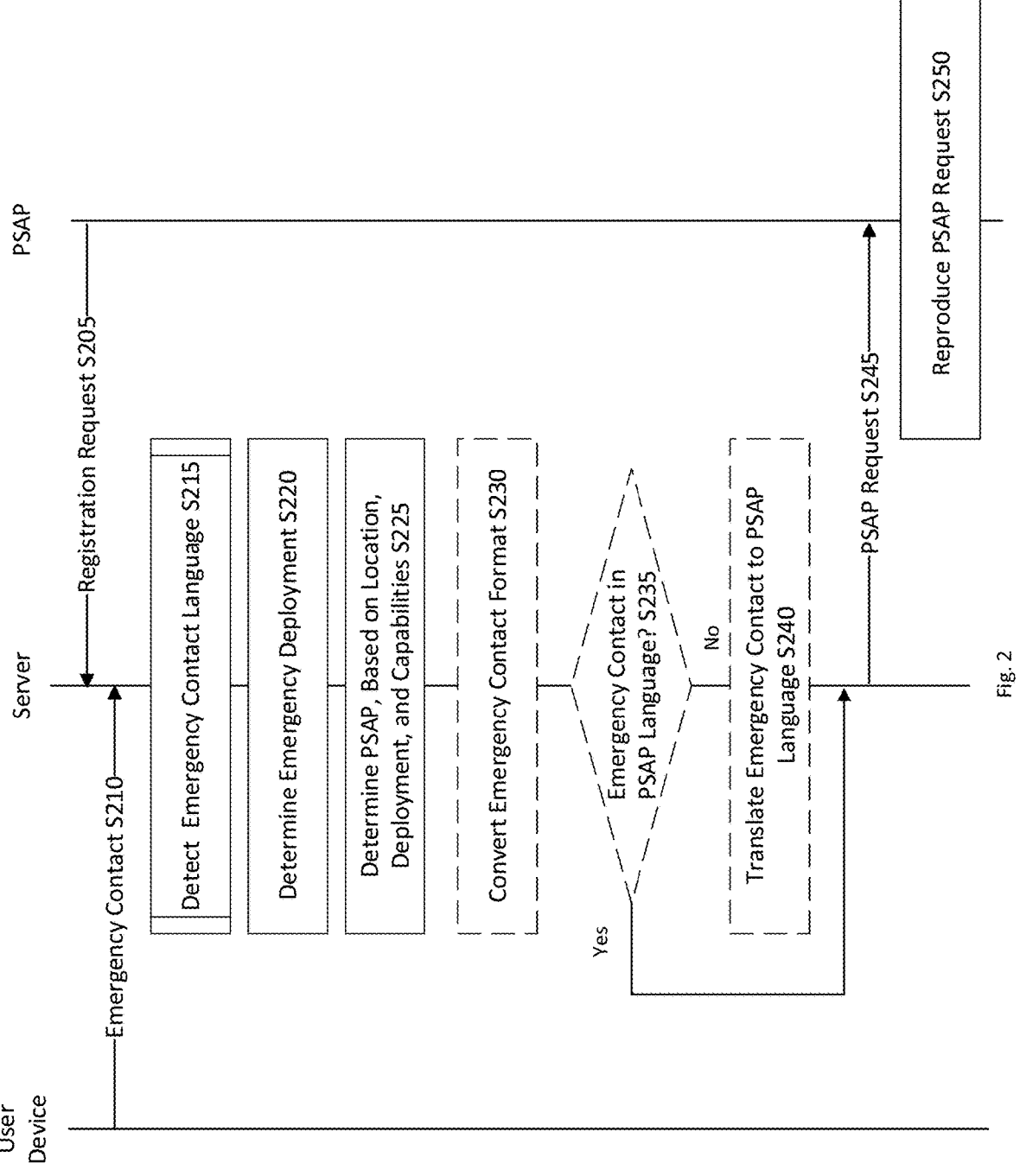
FIG. 2 illustrates a signal flow for dispatching emergency services by determining availability of text, language, and dispatch support of a PSAP, according to an implementation of the present disclosure.

FIG. 2 illustrates a signal flow for dispatching emergency service by determining availability of text, language, and dispatch support of a PSAP, according to an implementation of the present disclosure.

At S205, the PSAP transmits a registration request to the server. The registration request can include, for example, an ID of the PSAP, communication capabilities, language capabilities, and emergency service dispatch capabilities of the PSAP. The registration request can include, for example, jurisdictional boundaries for each type of emergency service dispatch. The server receives the registration request.

In S210, the user device transmits an emergency contact. The emergency contact is a voice or non-voice message in a first language. The emergency contact can include an ID of the user device. The server receives the emergency contact.

The emergency contact can include a location of the user device. In some implementations, the user device includes (e.g., speaks or types) the location in the emergency contact.

In another implementation, the user device executes an app that can determine the location, such as Intrado Safety Shield or Intrado Revolution Mobile. For example, the app can determine the location, based on a geolocation provided by a global navigation satellite system (GNSS) system.

The GNSS system can be or comply with the Global Positioning System (GPS), Global Navigation Satellite System (GLONASS), BeiDou Navigation Satellite System, Galileo, Quasi-Zenith Satellite System (QZSS), or the Indian Regional Navigation Satellite System (IRNSS), as examples. The location can be expressed in coordinates of the GNSS system.

In such an implementation, the app can transmit the emergency contact, including the location.

In other implementations, a relay device receives the emergency contact and determines the location of the user device. The relay device can determine the location based on, for example, triangulation of the user device. The relay device relays the emergency contact, adding the location of the user device.

The server receives the emergency contact. In select implementations, the server can determine the location based on the ID of the user device. The signal flow then advances to S215.

In S215, the server detects the emergency contact language (e.g., the first language). This detection is described in more detail in FIG. 3. Returning to FIG. 2, the signal flow advances to S220.

In S220, the server determines an emergency deployment, based on the emergency contact and a dictionary of words in the language of the emergency contact.

For example, the server can determine whether the emergency contact relates primarily to a fire, medical, or police deployment.

In one implementation, the server performs this determination based on a label associated with words in the dictionary. For example, the entries for words like "blaze" and "extinguisher" in an English-language dictionary can be tagged with the label "fire." The dictionary entry for an ambiguous word like "burn" can be tagged with both a "fire" label and a "medical" label. The dictionary entry for a neutral word like "she" or "car" can have no label or a "neutral" label. The server then can determine a dominant label, such as by determining a most common label among words in the emergency contact.

As another example of determining a dominant label, the server can determine whether a label occurs in a sentence or in other proximity with a trigger word. For example, the emergency contact might briefly relate a situation (e.g., "My friend burned his hand in a fire."), before specifying the type of deployment desired (e.g., "Please send immediate medical assistance.") Although the emergency contact uses two words with "fire" labels (i.e., "burn" and "fire"), the server can determine the deployment type is "medical," based on the presence of a trigger word like "immediate" or "send."

In some implementations, the server can determine that two or more labels are dominant labels. In this case, the server can determine the deployment is two or more types (e.g., both "medical" and "fire"). The signal flow then advances to S225.

In S225, the server can determine an ID of the PSAP, based on the location of the emergency contact, the determined deployment, and/or the dispatch, communication, and linguistic capabilities of the PSAP.

At the outset, some providers, such as Intrado Corporation, maintain databases of locations and IDs of the nearest PSAP(s). Thus, determining an ID of a PSAP for the location 120 can be routine. An ID of a PSAP can be, for example, a telephone number of the PSAP.

Ideally, a PSAP can receive the communication, understand the language of the communication, and make an appropriate emergency service deployment to the location. However, select implementations according to the present disclosure can overcome some difficulties, such as addressing linguistic and/or communication technology differences.

Thus, the PSAP nearest the location might be unable to efficiently handle the emergency contact. For example, the nearest PSAP might be unable to understand the language of the emergency contact or might be unable to dispatch the deployment type entirely or, at least, to the location of the user device.

Thus, the server can determine the ID of the PSAP also based on the emergency service deployment determined in S220 and the dispatch capability in the registration request. Further, the server can determine the ID of the PSAP based on the location of the user device and the boundaries in the registration request for the deployment determined in S220.

The signal flow then advances to S230.

In S230, the server optionally can convert the emergency contact from a non-voice message to a voice message based on a text-to-speech synthesizer. The signal flow then advances to S235.

In S235, the server optionally determines whether the emergency contact is in the language capabilities in the registration request. If the server determines the language of the emergency contact is not among the PSAP language capabilities, then the signal flow advances to S240.

In S240, the server translates the language of the emergency contact into the language of the PSAP (e.g., a second language) to produce a translated emergency contact. This translation can be based, for example, on a dictionary or phrase book of terms in the language of the PSAP. The signal flow then advances to S245.

Briefly returning to S230, if the server determines the language of the emergency contact is in the language of the PSAP in the registration request, then the signal flow advances to S245.

In S245, the server transmits a PSAP request. The PSAP request can include the emergency contact. In some implementations, the PSAP request includes the location of the user device. If the emergency contact was translated into the language of the PSAP, the PSAP request can include the translated emergency contact. The PSAP request can also include a transcript of a voice message in the emergency contact. The PSAP receives the PSAP request.

In S250, the PSAP reproduces the PSAP request in a language understood at the PSAP. For example, the PSAP can display a text message or audibly reproduce a voice message.

User devices, such as smartphones, can have various languages registered therein. For example, upon initialization, the operating system of a smartphone asks a user to register a language for interactions. In addition, a smartphone can execute particular communication applications that can register an additional language for interactions with the user.

Figure 3:
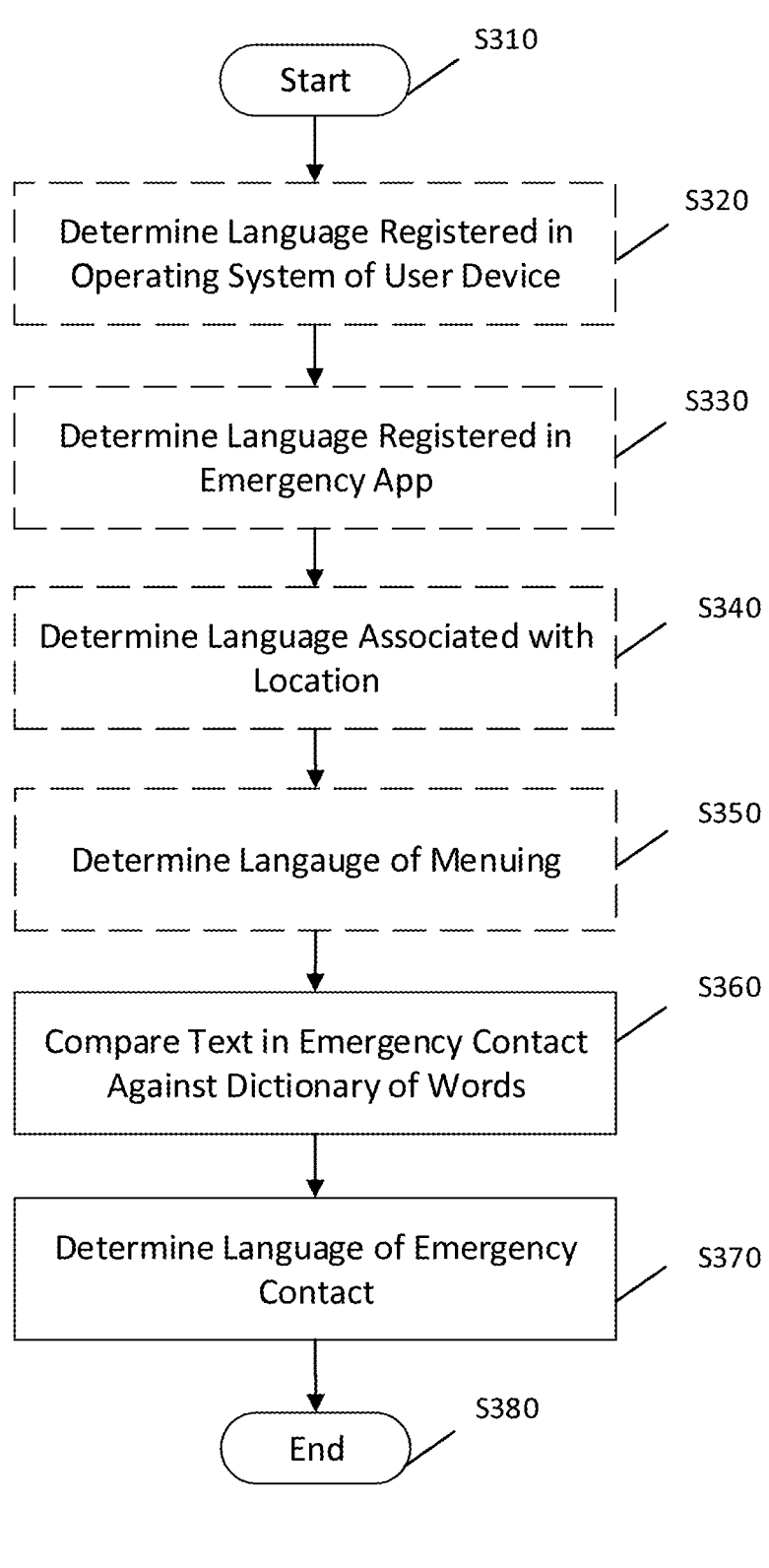
FIG. 3 illustrates an algorithm for detecting a language of an emergency contact, according to an implementation of the present disclosure.

FIG. 3 illustrates an algorithm 300 for detecting a language of an emergency contact, according to an implementation of the present disclosure.

The algorithm 300 begins at S310 and advances to S320.

In S320, the server optionally can determine the language registered in the operating system of the user device.

In some implementations, the user device can include an identifier of this language in its text message. In other implementations, the server can request an identifier of this operating system language from the user device. The user device then can respond with the identifier of the registered operating system language. In many such implementations, the server and the user device can perform this request and response via an application (such as an emergency app described in more detail below), rather than via Short Message Service (SMS), for example. The algorithm 300 then advances to S330.

In optional S330, the server can determine the language registered in an emergency app of the user device.

The user of the user device might prefer one language for the operating system menus for any number of reasons. For example, the user might be learning that language, or the user might want language compatibility with their workplace. On the other hand, the user might prefer a different language, such as a more familiar language, in the case of an emergency. Because some applications are intended for emergency use, these applications can allow the user to select a different language than in the case of the operating system. Such an app can be, for example, Intrado Safety Shield or Intrado Revolution Mobile.

In select implementations, the user device can transmit an identifier of the language registered in the emergency app, when the user device transmits an emergency contact via the emergency app. In other implementations, when the server receives the emergency contact, the server can request the identifier of the language registered in the emergency app. The server can request this identifier from the user device and/or from a server for the emergency app.

In optional S340, the server determines one or more languages associated with the location. For example, the server can determine that an emergency contact from Miami is more likely to be in Spanish or English, while an emergency contact in Maine is more likely to be in French or English. This determination can be particularly relevant in which languages are spoken by populations in concentrated locations, such as indigenous languages.

In S350, the server optionally can determine the language of any menuing associated with the emergency contact. For example, if the server receives a user telephone or VOIP call, the server can audibly ask a user via a menu to press a particular dialpad button (e.g., "4") for a particular language (e.g., "Polish" in English or "polski" in Polish). Thus, it is possible to use such menus to identify a language for a particular communication.

In S36o, the server individually compares each word of the emergency contact against a dictionary of words in various languages. Thus, the server can determine, for each word, one or more languages including the word. The server then can determine a likely language of the emergency contact as the language that includes the greatest number of words in the emergency contact.

In S370, the server then determines the language of the emergency contact, optionally based on the registered operating system language, the registered emergency app language, the one or more languages associated with the location, and the language of any server menuing requested by the user device. The server also determines the language of the emergency contact, based on the likely language determined in S340.

In S38o, the algorithm 300 then concludes.

The algorithm 300 can determine the language of the emergency contact, based on the language of individual words in the emergency contact. However, such a determination might be inaccurate, if the user device sends multiple, short emergency contacts, rather than fewer, longer emergency contacts, for example. Thus, some implementations of the server can more accurately determine the language of the emergency contact, based on the languages registered in the operating system or emergency app, languages associated with the location, and/or languages requested for menuing by the user device.

Figure 4:
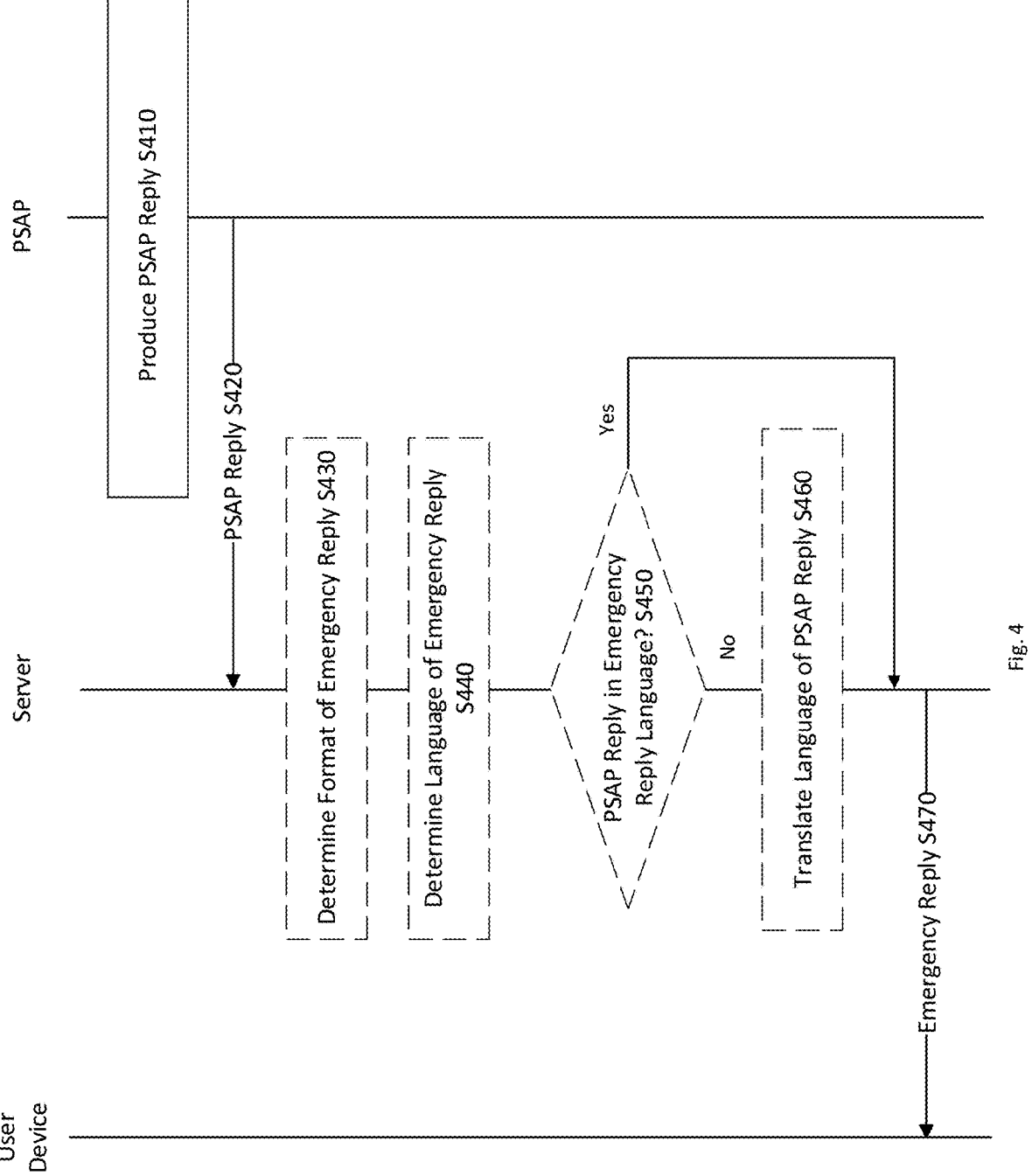
FIG. 4 illustrates a signal flow for replying to an emergency contact, according to an implementation of the present disclosure.

FIG. 4 illustrates a signal flow for replying to an emergency contact, according to an implementation of the present disclosure.

FIG. 4 can be read in connection with FIG. 2, and the operations of FIG. 4 can be performed including none, some, or all of the operations of FIG. 2.

The signal flow of FIG. 4 begins at S410 in which the PSAP produces a PSAP reply. In some implementations, the call taker at the PSAP audibly speaks a reply, and the PSAP records this reply with a microphone to produce a voice message as the PSAP reply. In other implementations, the call taker enters (e.g. types) text as the PSAP reply. The PSAP reply can be in a language familiar to the call taker.

However, the PSAP reply is not necessarily in a language familiar to the user. The PSAP reply can include the user device ID.

In S420, the PSAP transmits the PSAP reply. The server receives the PSAP reply.

In S430, the server determines the format (e.g., voice or non-voice) of an emergency reply to be transmitted to the user device. The format of the emergency reply can be the same as the format of the emergency contact. If the format of the emergency reply is different from the format of the PSAP reply, then the server can convert the format of the PSAP reply. For example, the server can convert a voice message to a non-voice message using speech-to-text technology.

In S440, the server optionally determines the language of an emergency reply. In implementations including the processing of S215 and/or S370, the language of the emergency reply can be the language determined in S215 and/or S370. In implementations in which the emergency contact was received through an emergency app, then many such implementations determine the language of the emergency reply to be the registered emergency app language.

In S450, the server optionally determines whether the PSAP reply is in the language of the emergency reply.

First, the server determines the language of the PSAP reply.

In implementations in which the server received the registration request in S205, the server can determine the language of the PSAP reply based on a language in the registration request.

Further, the server can compare words in the PSAP reply against a dictionary of words in different languages. Thus, although the registration request might not be conclusive as to the language (e.g., if the registration request indicates two or more languages), then the server can determine not to compare the words in the PSAP reply against words in the dictionary not in the languages identified by the registration request. Thus, the server can compare the words in the PSAP reply against only words in the languages identified by the registration request. Such a comparison can be more accurate and less time-consuming than comparing words in the PSAP reply against all of the words in the dictionary.

If the server determines the language of the PSAP reply is not the language of the emergency reply, then the signal flow advances to S460.

In S460, the server optionally translates the PSAP reply to the language of the emergency reply.

Briefly returning to S450, if the server determines the PSAP reply is in the language of the emergency reply, then the signal flow advances to S470.

In S470, the server transmits the emergency reply. This transmission can be performed based on the identifier of the user device. In other implementations, the transmission can be performed via a broadcast directed to the location. The user device receives the emergency reply and can reproduce it, for example, by displaying a non-voice message or playing a voice-message.

Figure 5:
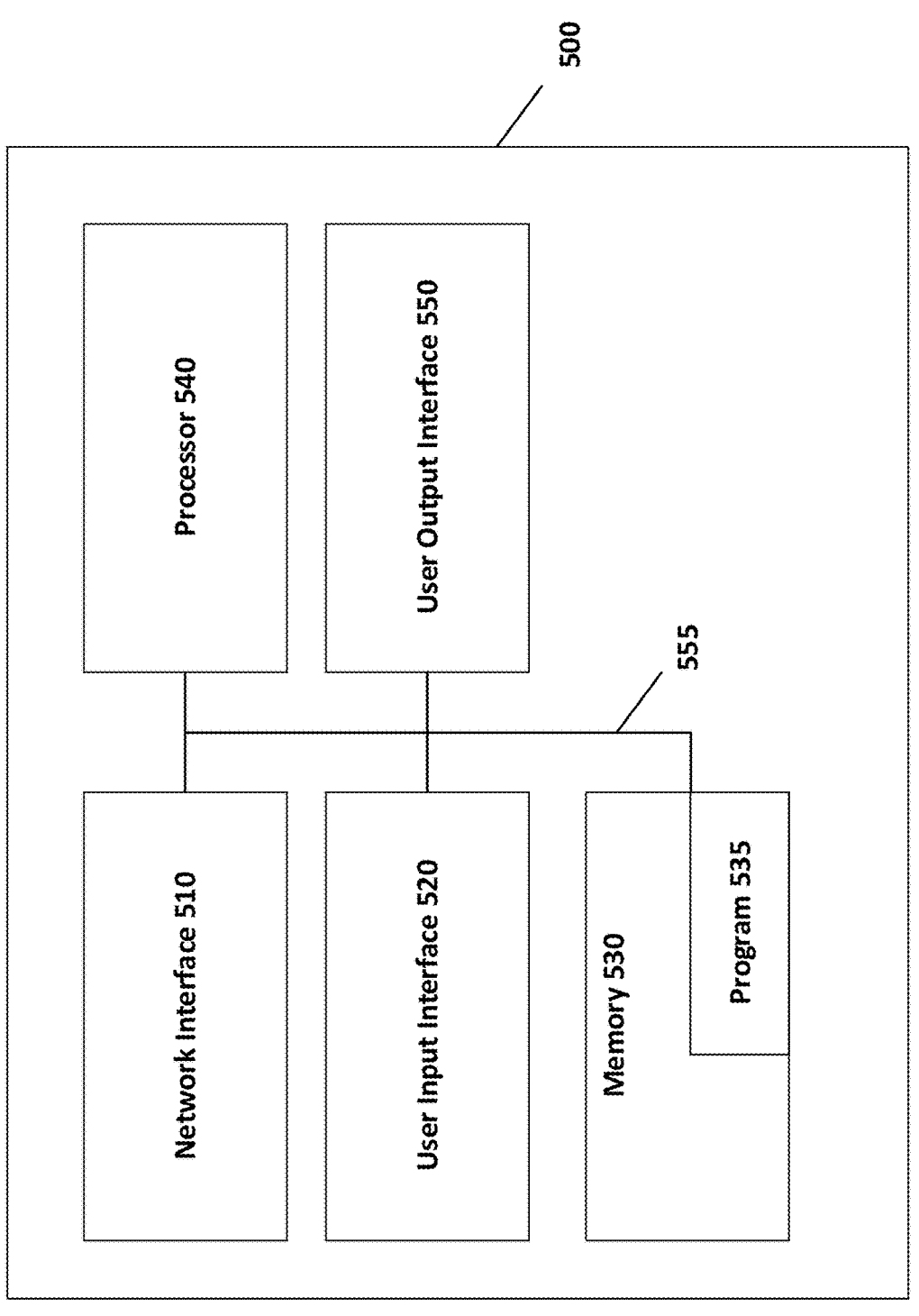
FIG. 5 illustrates a computing device, according to an implementation of the present disclosure.

FIG. 5 illustrates a computing device 500, according to an implementation of the present disclosure. The device 120 and/or the server 140 can be implemented by the computing device 500.

The computing device 500 can include a network interface 510, a user input interface 520, a memory 530, a program 535, a processor 540, a user output interface 550, and a bus 555.

Although illustrated within a single housing, the computing device 500 can be distributed across plural housings or sub-systems that cooperate in executing program instructions. In some implementations, the computing device 500 can include one or more blade server devices, standalone server devices, personal computers (including laptop computers and tablet computers), routers, hubs, switches, bridges, firewall devices, intrusion detection devices, mainframe computers, network-attached storage devices, smartphones and other mobile telephones, and other computing devices. Although the system executes the Windows OS, macOS, or Linux in many implementations, the system hardware can be configured according to a Symmetric Multi-Processing (SMP) architecture or a Non-Uniform Memory Access (NUMA) architecture.

The network interface 510 provides one or more communication connections and/or one or more devices that allow for communication between the computing device 500 and other computing systems (not shown) over a communication network, collection of networks (not shown), or the air, to support the conversion of text-to-voice/voice-to-text in service of emergency communications, outlined herein. The network interface can communicate using various networks (including both internal and external networks) such as near-field communications (NFC), Wi-Fi™, Bluetooth, Ethernet, cellular (e.g., 3G, 4G, 5G), white space, 802.11x, satellite, Bluetooth, LTE, GSM/HSPA, CDMA/EVDO, DSRC, CAN, GPS, facsimile, or any other wired or wireless interface. Other interfaces can include physical ports (e.g., Ethernet, USB, HDMI, etc.), interfaces for wired and wireless internal subsystems, and the like. Similarly, nodes and user equipment (e.g., mobile devices) of the system can also include suitable interfaces for receiving, transmitting, and/or otherwise communicating data or information in a network environment.

The user input interface 520 can receive one or more inputs from a human. The user input interface can be or include a mouse, a touchpad, a keyboard, a touchscreen, a trackball, a camera, a microphone, a joystick, a game controller, a scanner, or any other input device.

The memory 530, also termed a "storage," can include or be one or more computer-readable storage media readable by the processor 540 and that store software. The memory 530 can be implemented as one storage device or across multiple co-located or distributed storage devices or subsystems. The memory 530 can include additional elements, such as a controller, that communicate with the processor 540. The memory 530 can also include storage devices and/or sub-systems on which data and/or instructions are stored. The computing device 500 can access one or more storage resources to access information to carry out any of the processes indicated in this disclosure and, in particular, FIGS. 2-4. In various implementations, the memory 530 stores the program 535 to execute at least a portion of the algorithms illustrated in FIGS. 2-4. Further, the program 535, when executed by the computing device 500 generally and/or the processor 540 specifically, can direct, among other functions, performance of the operations of conversion of text-to-voice/voice-to-text in service of emergency communications, as described herein.

The memory 530 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a field programmable gate array (FPGA), a hard drive, a cache memory, a flash memory, a removable disk, or a tape reel. The memory 530 can be or include resistive RAM (RRAM) or a magneto-resistive RAM (MRAM). The information being tracked, sent, received, or stored in the communication system can be provided in any database, register, table, cache, queue, control list, or storage structure, based on particular implementations, all of which could be referenced in any suitable timeframe.

The processor 540 (e.g., a processing unit) can be or include one or more hardware processors and/or other circuitry that retrieve and execute software, especially the program 530, from the memory 530. The processor 540 can be implemented within one processing device, chip, or package and can also be distributed across multiple processing devices, chips, packages, or sub-systems that cooperate. In some implementations, the processor 540 is or includes a Graphics Processing Unit (GPU).

The processor 540 can have any register size, such as a 32-bit register or a 64-bit register, among others. The processor 540 can include multiple cores. Implementations of the processor 540 are not limited to any particular number of threads. The processor 540 can be fabricated by any process technology, such as 14 nm process technology.

The user output interface 550 outputs information to a human user. The user output interface 550 can be or include a display (e.g., a screen), a touchscreen, speakers, a printer, or a haptic feedback unit. In many implementations, the user output interface 550 can be combined with the user input interface 520. For example, some such implementations include a touchscreen, a headset including headphones and a microphone, or a joystick with haptic feedback.

In implementations including multiple computing devices, a server of the system or, in a serverless implementation, a peer can use one or more communications networks that facilitate communication among the computing devices to achieve the conversion of text-to-voice/voice-to-text in service of emergency communications, as outlined herein. For example, the one or more communications networks can include or be a local area network (LAN) or wide area network (WAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, an ASIC, and cache memory, and to transitory storage media, such as carrier waves or propagating signals.

Aspects of the system can be implemented in various manners, e.g., as a method, a system, a computer program product, or one or more computer-readable storage media). Accordingly, aspects of the present disclosure can take the form of a hardware implementation, a software implementation (including firmware, resident software, or microcode) or an implementation combining software and hardware aspects that can generally be referred to herein as a "module" or a "system." Functions described in this disclosure can be implemented as an algorithm executed by one or more hardware processing units, e.g., the processor 540. In various embodiments, different operations and portions of the operations of the algorithms described can be performed by different processing units. In some implementations, the operations can be achieved by reciprocating software in any of the device 120, the satellite 130, the server 140, and/or the call center 150. Furthermore, aspects of the present disclosure can take the form of a computer program product embodied in one or more computer-readable media having computer-readable program code embodied, e.g., encoded or stored, thereon. In various implementations, such a computer program can, for example, be downloaded (or updated) to existing devices and systems or be stored upon manufacture of these devices and systems.

Any suitable permutation can be applied to a physical implementation, including the design of the communications network in which the system is implemented. In one embodiment, the bus 555 can share hardware resources with the memory 530 and the processor 540. In this alternative implementation, the computing device 500 be provided with separate hardware resources including one or more processors and memory elements.

In example implementations, various other components of the computing device 500 can be installed in different physical areas or can be installed as single units.

The communication system can be configured to facilitate communication with machine devices (e.g., vehicle sensors, instruments, electronic control units (ECUs), embedded devices, actuators, displays, etc.) through the bus 555. Other suitable communication interfaces can also be provided for an Internet Protocol (IP) network, a user datagram protocol (UDP) network, or any other suitable protocol or communication architecture enabling network communication with machine devices.

The innovations in this detailed description can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable, non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. A non-transitory, computer-readable storage medium can include instructions to allow one or more processors to carry out the emulation.

In another example implementation, the electrical circuits of the drawings can be implemented as stand-alone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions on one chip substrate. Other implementations can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. For example, various modifications and changes can be made to the arrangements of components. The description and drawings are, accordingly, to be regarded in an illustrative sense, not in a restrictive sense.

The numerous examples provided herein described interaction in terms of two, three, or more electrical components for purposes of clarity and example. The system can be consolidated in any manner. Along similar design alternatives, the illustrated components, modules, and elements of the drawings can be combined in various possible configurations within the scope of this disclosure. In certain cases, one or more of the functionalities of a given set of flows might be more clearly described by referencing a limited number of electrical elements. The electrical circuits of the drawings are readily scalable and can accommodate many components, as well as more complicated/sophisticated arrangements and configurations. Accordingly, the provided examples do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation," "example implementation," "an implementation," "another implementation," "some implementations," "various implementations," "other implementations," "alternative implementation," and the like are intended to mean that any such features can be included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example M1, a method includes receiving an emergency contact; determining an emergency deployment, at least in part based on the emergency contact; determining a public safety access point (PSAP), at least in part based on the emergency deployment; and transmitting a PSAP request to the PSAP, at least in part based on the emergency contact.

Example M2 is the method of Example M1, further comprising: determining a first language of the emergency contact.

Example M3 is the method of Example M2, further comprising: receiving a registration request identifying a second language; and translating the emergency contact into the second language to produce the PSAP request.

Example M4 is the method of any of Examples M1-M3, further comprising: receiving a registration request, the registration request including a capability of the PSAP, wherein the PSAP is determined at least in part based on the capability.

Example M5 is the method of Example M4, wherein the registration request includes a jurisdiction of the PSAP, the emergency contact includes a location, and the PSAP is determined at least in part based on the jurisdiction and the location.

Example M6 is the method of any of Examples M1-M5, further comprising: receiving a PSAP reply; and transmitting an emergency reply, at least in part based on the PSAP reply.

Example M7 is the method of Example M6, further comprising: translating the PSAP reply to the first language to produce the emergency reply.

In Example A1, an apparatus includes a network interface that receives an emergency contact; and a processor configured to determine an emergency deployment, at least in part based on the emergency contact, and to determine a public safety access point (PSAP), at least in part based on the emergency deployment, wherein the network interface transmits a PSAP request to the PSAP, at least in part based on the emergency contact.

Example A2 is the apparatus of Example A1, wherein the processor further is configured to determine a first language of the emergency contact.

Example A3 is the apparatus of Example A2, wherein the network interface receives a registration request identifying a second language, and the processor further is configured to translate the emergency contact into the second language to produce the PSAP request.

Example A4 is the apparatus of any of Examples A1-A3, wherein the network interface receives a registration request, the registration request including a capability of the PSAP, and the processor further is configured to determine the PSAP at least in part based on the capability.

Example A5 is the apparatus of Example A4, wherein the registration request includes a jurisdiction of the PSAP, the emergency contact includes a location, and the processor further is configured to determine the PSAP at least in part based on the jurisdiction and the location.

Example A6 is the apparatus of any of Examples A1-A5, wherein the network interface receives a PSAP reply and transmits an emergency reply, at least in part based on the PSAP reply.

Example A7 is the apparatus of Example A6, wherein the processor further is configured to translate the PSAP reply to the first language to produce the emergency reply.

In Example C1, a computer-readable medium includes instructions that, when executed by a processor, perform operations comprising: determining an emergency deployment, at least in part based on an emergency contact; and determining a public safety access point (PSAP), at least in part based on the emergency deployment, wherein a PSAP request is transmitted to the PSAP, at least in part based on the emergency contact.

Example C2 is the medium of Example C1, the operations further comprising: determining a first language of the emergency contact.

Example C3 is the medium of Example C2, the operations further comprising: translating the emergency contact into a second language to produce the PSAP request, at least in part based on a received registration request identifying the second language.

Example C4 is the medium of any of Examples C1-C3, the operations further comprising: receiving a registration request, the registration request including a capability of the PSAP, wherein the PSAP is determined at least in part based on the capability.

Example C5 is the medium of Example C4, wherein the registration request includes a jurisdiction of the PSAP, the emergency contact includes a location, and the PSAP is determined at least in part based on the jurisdiction and the location.

Example C6 is the medium of any of Examples C1-C5, the operations further comprising: transmitting an emergency reply, at least in part based on a received PSAP reply.

Example C7 is the medium of Example C6, the operations further comprising: translating the PSAP reply to the first language to produce the emergency reply.

In Example F1, an apparatus includes communication means for receiving an emergency contact; and processing means for determining an emergency deployment, at least in part based on the emergency contact and for determining a public safety access point (PSAP), at least in part based on the emergency deployment, wherein the communication means transmit a PSAP request to the PSAP, at least in part based on the emergency contact.

Example F2 is the apparatus of Example F1, wherein the processing means determines a first language of the emergency contact.

Example F3 is the apparatus of Example F2, wherein the communication means receives a registration request identifying a second language, and the processing means translates the emergency contact into the second language to produce the PSAP request.

Example F4 is the apparatus of any of Examples F1-F3, wherein the communication means receives a registration request, the registration request including a capability of the PSAP, and the processing means determines the PSAP at least in part based on the capability.

Example F5 is the apparatus of Example F4, wherein the registration request includes a jurisdiction of the PSAP, the emergency contact includes a location, and the processing means determines the PSAP at least in part based on the jurisdiction and the location.

Example F6 is the apparatus of any of Examples F1-F5, wherein the communication means receives a PSAP reply and transmits an emergency reply, at least in part based on the PSAP reply.

Example F7 is the apparatus of Example F6, wherein the processing means translates the PSAP reply to the first language to produce the emergency reply.

We claim:

1. A method, comprising:

receiving an emergency contact in a first language;

determining an emergency deployment, at least in part based on the emergency contact and at least one label for a plurality of words, each of the at least one label indicating at least one of a fire deployment, a medical deployment, or a police deployment, wherein the emergency deployment is determined at least in part based on a dictionary including the plurality of words;

determining a public safety access point (PSAP), at least in part based on the emergency deployment; and transmitting a PSAP request to the PSAP, at least in part based on the emergency contact.

2. The method of claim 1, further comprising:

determining the first language of the emergency contact; and translating the emergency contact into a second language to produce the PSAP request.

3. The method of claim 1, further comprising:

receiving a registration request, the registration request including a capability of the PSAP, wherein the PSAP is determined at least in part based on the capability.

4. The method of claim 3, wherein the registration request includes a jurisdiction of the PSAP, the emergency contact includes a location, and the PSAP is determined at least in part based on the jurisdiction and the location.

5. The method of claim 1, further comprising:

receiving a PSAP reply;

translating the PSAP reply to the first language to produce an emergency reply; and transmitting the emergency reply.

6. An apparatus, comprising:

a network interface that receives an emergency contact in a first language; and a processor configured to determine an emergency deployment, at least in part based on the emergency contact and at least one label for a plurality of words, and to determine a public safety access point (PSAP), at least in part based on the emergency deployment, each of the at least one label indicating at least one of a fire deployment, a medical deployment, or a police deployment, wherein the emergency deployment is determined at least in part based on a dictionary including the plurality of words, and the network interface transmits a PSAP request to the PSAP, at least in part based on the emergency contact.

7. The apparatus of claim 6, wherein the processor further is configured to determine the first language of the emergency contact and to translate the emergency contact into a second language to produce the PSAP request.

8. The apparatus of claim 6, wherein the network interface receives a registration request, the registration request including a capability of the PSAP, and the processor further is configured to determine the PSAP at least in part based on the capability.

9. The apparatus of claim 8, wherein the registration request includes a jurisdiction of the PSAP, the emergency contact includes a location, and the processor further is configured to determine the PSAP at least in part based on the jurisdiction and the location.

10. The apparatus of claim 6, wherein the network interface receives a PSAP reply and transmits an emergency reply, and the processor further is configured to translate the PSAP reply to the first language to produce the emergency reply.

11. A non-transitory computer-readable medium including instructions that, when executed by a processor, perform operations comprising:

determining an emergency deployment, at least in part based on an emergency contact in a first language and at least one label for a plurality of words, each of the at least one label indicating at least one of a fire deployment, a medical deployment, or a police deployment, wherein the emergency deployment is determined at least in part based on a dictionary including the plurality of words; and determining a public safety access point (PSAP), at least in part based on the emergency deployment, wherein a PSAP request is transmitted to the PSAP, at least in part based on the emergency contact.

12. The medium of claim 11, the operations further comprising:

determining the first language of the emergency contact; and translating the emergency contact into a second language to produce the PSAP request.

13. The medium of claim 11, the operations further comprising:

receiving a registration request, the registration request including a capability of the PSAP, wherein the PSAP is determined at least in part based on the capability.

14. The medium of claim 13, wherein the registration request includes a jurisdiction of the PSAP, the emergency contact includes a location, and the PSAP is determined at least in part based on the jurisdiction and the location.

15. The medium of claim 11, the operations further comprising:

translating a received PSAP reply to the first language to produce an emergency reply; and transmitting the emergency reply, at least in part based on the received PSAP reply.

16. The method of claim 1, wherein the emergency deployment is determined at least in part based on a dominant label among the at least one label.

17. The apparatus of claim 6, wherein the emergency deployment is determined at least in part based on a dominant label among the at least one label.

* * * * *